United States Patent [19]

Lebedev et al.

[11] Patent Number: 4,715,523

[45] Date of Patent: Dec. 29, 1987

[54] ELECTROMAGNETIC POWER DRIVE FOR A FRICTION WELDING MACHINE

[76] Inventors: Vladimir K. Lebedev, ulitsa Engelsa, 25, kv. 12; Ivan A. Chernenko, ulitsa Lomonosova, 24, kv. 125; Alexandr T. Dyshlenko, ulitsa Vasilkovskaya, 49, korpus 3, kv. 14; Leonid V. Litvin, ulitsa Vernadskogo, 87, kv. 46; Vladimir I. Tishura, ulitsa Chigorina, 55, kv. 27, all of Kiev, U.S.S.R.

[21] Appl. No.: 930,664

[22] Filed: Nov. 12, 1984

[51] Int. Cl.⁴ .................... B23K 20/12; B23K 27/00
[52] U.S. Cl. ........................................ 228/2; 228/102; 228/112; 318/115
[58] Field of Search .................. 228/102, 112, 2; 318/115, 601, 604, 696, 653

[56] References Cited

U.S. PATENT DOCUMENTS

| | | | |
|---|---|---|---|
| 3,623,214 | 11/1971 | Sciaky et al. | 228/102 |
| 4,067,490 | 1/1978 | Jones et al. | 228/102 |
| 4,234,831 | 11/1980 | Kemmer et al. | 318/115 |
| 4,286,181 | 8/1981 | Guzman et al. | 318/115 |

FOREIGN PATENT DOCUMENTS

| | | | |
|---|---|---|---|
| 593862 | 2/1978 | U.S.S.R. | 228/2 |
| 715261 | 2/1980 | U.S.S.R. | 228/102 |
| 948584 | 8/1982 | U.S.S.R. | 228/102 |

Primary Examiner—Nicholas P. Godici
Assistant Examiner—Samuel M. Heinrich
Attorney, Agent, or Firm—Lilling & Greenspan

[57] ABSTRACT

An electromagnetic power drive for a friction welding machine, comprising a magnetic core installed immovably, which carries a power coil connected to a voltage regulator made as a switch and at least one pickup coil connected to an integrator producing voltage proportional to the actual value of the magnetic flux during friction welding, which is connected to a comparison means comprising two comparators, a driving input of one of said comparators receives voltage proportional to the assigned value of the magnetic flux during friction welding, the driving input of the other comparator receives voltage proportional to the other assigned value of the magnetic flux, and a control signal generator having a hysteresis-loop output characteristic, which is connected to the comparators, the output of said generator being the output of the comparison means electrically coupled with the voltage regulator.

1 Claim, 3 Drawing Figures

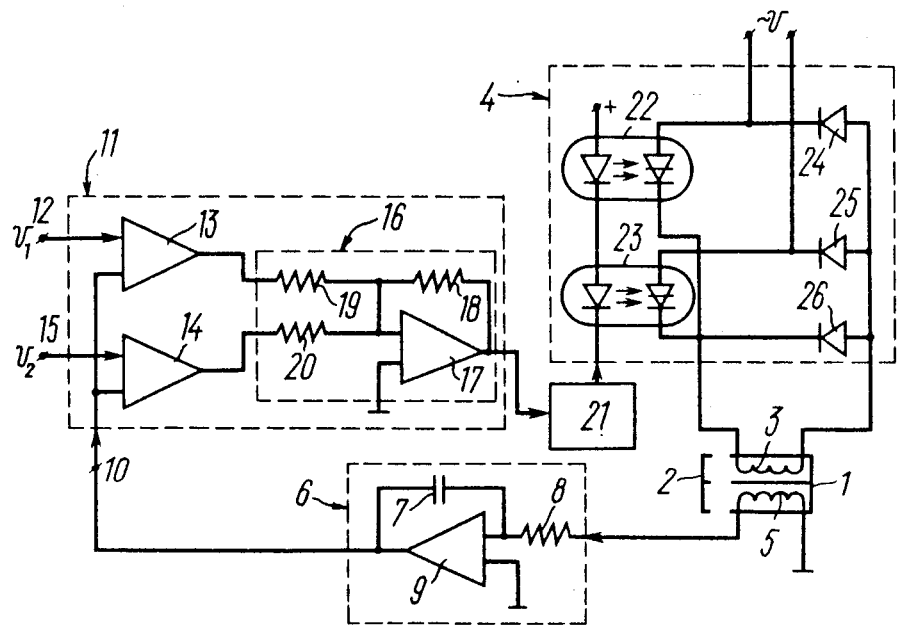
FIG.1
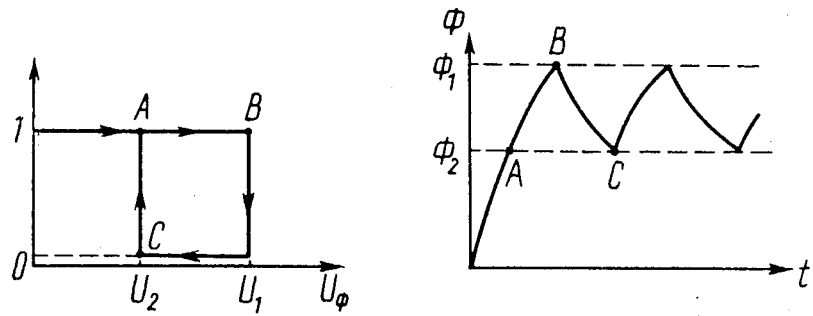
FIG.2
FIG.3

ELECTROMAGNETIC POWER DRIVE FOR A FRICTION WELDING MACHINE

BACKGROUND OF THE INVENTION

This invention relates to pressure welding equipment and, in particular, to an electromagnetic power drive for a pressure welding machine.

The invention can be effectively used in the machine building industry, machine tool industry, and in the chemical industry. The invention is of particular advantage in friction welding of dissimilar materials having different thermo-physical properties and coated by oxide films.

DESCRIPTION OF THE PRIOR ART

At present, friction welding of dissimilar materials having sharply contrasting thermophysical properties is the focus of attention by engineers. The use of electromagnetic power drives producing a stable axial effort during heating in the process of welding cannot provide a high quality welded joint because the temperature field is irregularly distributed over the cross-section of the welded workpieces. A more uniformly distributed temperature field can be obtained in the weld zone by using electromagnetic power drives which produce a pulsating axial force. But existing electromagnetic power drives have no means for regulating the parameters of this pulsating axial effort over a range required for welding of dissimilar materials.

Known in the art is an axial effort power drive (cf., for example, USSR Inventor's Certificate No. 715,261 IPC B 23 K 20/12, publ. 1980) employed in a pressure welding machine and comprising two magnetic cores, the first magnetic core being stationary, while the second magnetic core is adapted for axial motion in relation to the first magnetic core which carries a power coil supplied by constant current.

In this electromagnetic power drive, pulsating axial effort proportional to the magnetic flux is produced by the magnetic interaction of magnetic cores whose butt ends have specific geometrical shapes. Depending on the rotational speed of the second magnetic core and the desired pulsation frequency, these butt ends can be shaped as polyhedrons, ellipses, etc. But this electromagnetic power drive is deficient in that the pulsating axial force cannot be regulated over a sufficiently broad range.

Also known in the art is an electromagnetic power drive of a friction welding machine (cf., USSR Inventor's Certificate No. 948,584 IPC B23K 20/12, publ. 1982), comprising two magnetic cores, the first core being placed stationary, while the second core is adapted for axial motion and rotation in relation to the first magnetic core on which a power coil is installed and connected to an output of a voltage regulator, and at least one measuring coil connected to an input of an integrator generating a voltage proportional to the current magnitude of the magnetic flux in the process of friction welding, whose output is connected to an input of a comparison means whose control input receives a voltage proportional to the assigned magnetic flux in the process of friction welding, and whose output is electrically connected to a control input of the voltage regulator.

Three series-connected pickup coils are arranged on the stationary magnetic core having two concentrically positioned poles. One pickup coil is located on the external surface of the pole positioned in the central part of the core, while the second and third pickup coils are located, respectively, on the internal and external surfaces of the pole enbracing the central pole.

This arrangement and connection of coils permits more accurate measurement of current magnitudes of magnetic fluxes of the electromagnet poles in the process of friction welding, and, when these current values are compared with the assigned magnitude of the magnetic flux, generation of control signals fed to the voltage regulator. In this manner, the axial force can be stabilized and made independent of the size of the gap between two cores.

But this electromagnetic power drive for a friction welding machine is deficient in that, during friction welding of dissimilar materials having sharply contrasting thermophysical properties, the stable axial force cannot provide high-quality welded joints due to irregular distribution of the temperature field over the cross-section of the workpieces being welded together.

SUMMARY OF THE INVENTION

It is an object of the present invention to provide an electromagnetic power drive for a friction welding machine, which can produce, in the process of welding, a pulsating axial effort controllable over a wide range in order to improve the quality of welding, particularly of dissimilar materials having sharply contrasting thermophysical properties.

This is achieved in an electromagnetic power drive of a pressure welding machine, which comprises two magnetic cores, the first core being secured stationary, while the second magnetic core is adapted for axial motion and rotation in relation to the first magnetic core carrying a power coil connected to an output of a voltage regulator and at least one pickup coil connected to an input of an integrator generating a voltage proportional to the current value of the magnetic flux in the process of friction welding, whose output is connected to an input of a comparison means, whose input receives a voltage proportional to the assigned value of the magnetic flux during friction welding and whose output is electrically connected to a control input of the voltage regulator, according to the invention, the comparison means comprises two comparators whose inputs are joined together and are the input of the comparison means, a driving input of one comparator being the driving input of the comparison means, while the driving input of the other comparator receives voltage proportional to the desired value of the magnetic flux during friction welding, and a control signal generator having a hysteresis loop output characteristic, whose input is connected to outputs of the comparators, while the output of said generator is the output of the comparison means, the voltage regulator being made as a switch commutated by control signals fed by the control signal generator.

The herein disclosed electromagnetic power drive for a friction welding machine provides a pulsating axial effort whose maximum and minimum can be regulated over a wide range, from zero to the rated value dictated by the size of the magnetic cores, and permits stabilization of the maximum and minimum axial efforts in the friction welding process by relative motion of the magnetic cores. When this effort is applied to the workpieces being heated during the welding process, a more uniform distribution of the temperature field is achieved over the workpiece cross-section. This makes the thermal zone, from the center to the periphery of the welded area, more uniform. In this manner, the quality of welding is improved, particularly when dissimilar materials, such as vanadium+steel or molybdenum+tungsten, having sharply contrasting thermophysical properties are welded together, or when similar materials coated by oxide films are welded together.

BRIEF DESCRIPTION OF THE DRAWINGS

The invention will now be described in more detail, by way of example, with reference to the accompanying drawings wherein:

FIG. 1 shows a block diagram of an electromagnetic power drive of a friction welding machine, according to the invention;

FIG. 2 shows an output characteristic of a comparison means, according to the invention; and FIG. 3 shows a time chart of the magnetic flux in the cores of the electromagnetic power drive for a friction welding machine, according to the invention.

DESCRIPTION OF THE PREFERRED EMBODIMENT

An electromagnetic power drive for a friction welding machine, according to the invention, comprises two magnetic cores 1 and 2 (FIG. 1). The first magnetic core 1 is stationary, while the second magnetic core 2 is adapted for axial motion and rotation with respect to the first magnetic core 1 carrying a power coil 3 connected to an output of a voltage regulator 4 and a pickup coil 5 connected to an input of an integrator 6. In other embodiments the number of pickup coils 5 can be more than one and is dictated by the shape of the magnetic core 1. The time constant of the integrator 6 is determined by a capacitor 7 and a resistor 8 which are connected to an operational amplifier 9. The integrator 6 generates a voltage proportional to the actual value of the magnetic flux during the friction welding process. The output of the integrator 6 is connected to an input 10 of a comparison means 11 whose driving input 12 receives a voltage proportional to the assigned value of the magnetic flux in the friction welding process.

The comparison means 11 comprises two comparators 13 and 14 whose comparision inputs are joined together to form the input 10 of the comparison means 11. The driving input of the comparator 13 is the driving input 12 of the comparison means 11. The driving input of the other comparator 14, which is the other driving input 15 of the comparison means 11, receives voltage proportional to the assigned value of the magnetic flux during the welding process. The comparison means 11 also comprises a control pulse generator 16 having a hysteresis output characteristic which is produced in this embodiment of the drive by an operational amplifier 17 using a Schmitt trigger circuit. The control pulse generator 16 also comprises a feedback resistor 18 whose rated resistance is equal to the rated resistances of resistors 19 and 20 which connect outputs of the comparators 13 and 14 with the input of the operational amplifier 17. The output of the operational amplifier 17 is the output of the control pulse generator 16, which, in turn, is the output of the comparison means 11, connected to a control input of the voltage regulator 4 via a power amplifier 21.

The control pulse generator 16 can be configured in other ways, e.g. using an RC trigger circuit featuring adjustable inputs.

The voltage regulator 4 is a switch made, in this embodiment, as a semi-controllable rectifier bridge comprising controlled rectifiers 22 and 23, uncontrolled rectifiers 24 and 25, and a shunted rectifier 26. The switch can also use switching-type transistors or other switching elements.

The voltage regulator 4 is switched by control signals fed from the control pulse generator 16.

Referring to FIGS. 2 and 3, operation of the electromagnetic power drive for a friction welding machine is explained by way of charts. FIG. 2 shows the output characteristic of the comparison means 11, wherein the current output voltage $V_\Phi$ of the integrator 6, which is proportional to the current value of the magnetic flux $\Phi$ in the magnetic cores 1 and 2 during friction welding, is laid off as the abscissa, and the output logical signal of the comparison means 11 is laid off as the ordinate. FIG. 3 shows a diagram of the current value of the magnetic flux $\Phi$ in the magnetic cores 1 and 2 (FIG. 1), plotted on the vertical axis, versus time t plotted on the horizontal axis.

The electromagnetic power drive for a friction welding machine operates as follows.

Prior to switching on the electromagnetic power drive, voltages $V_1$ and $V_2$ (FIG. 2) proportional, in this embodiment, to the assigned values of the maximum and minimum magnetic fluxes $\Phi_1$ and $\Phi_2$ (FIG. 3) during the friction welding process are applied to the driving inputs 12 and 15 (FIG. 1) of the comparison means 11. At this stage, the voltage on the input 10 (FIG. 1) of the comparison means 11 is zero, and output voltages of the comparators 13 and 14, which correspond to the logical zero, are applied to the input of the operational amplifier 17 featuring a feedback resistor 18. To summarize, prior to switching on the electromagnetic power drive, the output voltage of the comparison means 11 assumes the value of a logical one (FIG. 2), because this comparison means 11 comprises the control signal generator 16 whose output characteristic is a hysteresis loop. When the electromagnetic power drive is energized, this output signal of the comparison means 11 (FIG. 1) is supplied, via the power amplifier 21, to the control input of the voltage regulator 4 and makes controlled rectifiers 22 and 23 conductive. The supply voltage V rectified by the semi-controlled rectifier bridge of the voltage regulator 4 is supplied to the power coil 3 where current grows and, consequently, the magnetic flux $\Phi$ in the magnetic cores 1 and 2 increases too. The electromotive force e is induced in the pickup coil 5 in proportion to the change of the magnetic flux $\Phi$, which is given by the following relationship:

$$e = -W\frac{d\Phi}{dt},$$

where W is the number of turns in the pickup coil 5.

The electrical signal is supplied from the pickup coil 5 to the input of the integrator 6 whose output voltage is given by the relationship:

$$V_\Phi = \frac{W\Phi}{RC},$$

where R is resistance of the resistor 3, and C is capacity of the capacitor 7. This output voltage is fed to the input 10 of the comparison means 11. When the output voltage $V_\Phi$ of the integrator 6 reaches the level of the driving voltage $V_2$ at the driving input 15 of the comparator 14, the output signal of said comparator 14 becomes a logical one. But the output signal of the comparison means 11 (point A, FIG. 2) remains unchanged, and the magnetic flux Φ (section A B, FIG. 3) continues to grow. When the output voltage V<sub>Φ</sub> of the integrator 6 reaches the level of the driving voltage $V_1$ (point B, FIG. 2), which is proportional to the assigned value of the magnetic flux $\Phi_1$ (FIG. 3), the output signal of the comparator 13 assumes the value of a logical one and is fed to the input of the control signal generator 16 whose output also becomes a logical zero, and the controlled rectifiers 22 and 23 of the voltage regulator 4 are rendered nonconductive. Here the transient process of current decrease is started in the power coil 3 via the shunting rectifier 26 of the voltage regulator 4. This leads to gradual reduction of the magnetic flux Φ in the magnetic cores 1 and 2 and corresponds to the section BC in the diagram of FIG. 3.

When the magnetic flux in the magnetic cores 1 and 2 reaches its minimal value (point C, FIG. 3), the output voltage of the integrator 6 decreases to the level of the driving voltage $V_2$ (point C, FIG. 2) at the driving input 15 of the switch 14. The comparison means 11 is brought back to the state which existed before the electromagnetic power drive had been switched on—its output signal is again a logical one and the controlled rectifiers 22 and 23 of the voltage regulator 4 are made conductive. Current in the power coil 3 increases, as does the magnetic flux in the magnetic cores 1 and 2 until it reaches the value dictated by the driving voltage $V_1$ at the driving input 12 of the comparator 13 in the comparison means 11.

Since the comparison means 11 has two driving inputs 12 and 15 and is equipped with the control signal generator 16 having a hysteresis output characteristic, and the voltage regulator 4 is made as a switch, the processes of varying the magnetic flux in the magnetic cores 1 and 2 are repeated in a cyclic manner.

The pattern of variations of the magnetic flux in the magnetic cores 1 and 2 corresponds to the pattern of variations of the axial effort F during the friction welding process, which is produced in the gap between the magnetic cores 1 and 2, which is given by the following equation:

$$F = \frac{\Phi^2}{2\mu_o S},$$

where
S is the area of poles of magnetic cores 1 and 2,
$\mu_o$ is the absolute permittivity.

To summarize, the axial effort F is dictated, during the friction welding process, by the actual value of the magnetic flux Φ in the magnetic cores 1 and 2, irrespective of the gap between these cores. The minimum and maximum values of the pulsating axial effort F can be controlled over a broad range by controlling the driving voltages $V_1$ and $V_2$ on the driving inputs 12 and 15 of the comparison means 11, from zero to the level corresponding to the rated value of the axial effort developed by the electromagnetic power drive according to the invention.

The use of the pulsating axial force during friction welding of workpieces made of dissimilar materials having contrasting thermophysical properties leads to periodic shifts of the maximum heat release zone from the center to the periphery and back. This equalizes the temperature field and makes the weld heating more uniform. Oxide films are destroyed, and the structure of the welded joint becomes fine grained. The overall quality of the weld is improved.

What is claimed is:
1. An electromagnetic power drive for a friction welding machine, comprising:
 a first magnetic core which is stationary;
 a second magnetic core adapted for axial motion and rotation in relation to said first magnetic core;
 a power coil installed on said first magnetic core;
 at least one pickup coil installed on said first magnetic core;
 an integrator producing voltage proportional to the actual value of the magnetic flux during said friction welding, having an output and an input connected to each said pickup coil;
 a comparison means having an input connected to said output of said integrator, a first driving input, a second driving input, and an output;
 a first comparator having an input, an output, and a driving input which is said first driving input of said comparison means, to which voltage proportional to a first assigned value of the magnetic flux is applied;
 a second comparator having an output, a driving input which is said second driving input of said comparison means, to which voltage proportional to a second assigned value of the magnetic flux is applied during said friction welding, and an input joined together with said input of said first comparator in order to form said input of said comparison means;
 a control signal generator having a hysteresis output characteristic, an input connected to said outputs of said first and second comparators, and an output which is said output of said comparison means; and
 a voltage regulator made as a switch operated by control signals of said control signal generator, having a control input electrically connected to said output of said comparison means, and an output connected to said power coil.

* * * * *